US010496828B2

(12) United States Patent
Bellala et al.

(10) Patent No.: US 10,496,828 B2
(45) Date of Patent: Dec. 3, 2019

(54) ATTRIBUTE DETERMINATION USING SECURE LIST MATCHING PROTOCOL

(71) Applicant: Hewlett Packard Enterprise Development LP, Houston, TX (US)

(72) Inventors: Gowtham Bellala, Palo Alto, CA (US); Bernardo Huberman, Palo Alto, CA (US); Amip J. Shah, Santa Clara, CA (US)

(73) Assignee: HEWLETT PACKARD ENTERPRISE DEVELOPMENT LP, Houston, TX (US)

(*) Notice: Subject to any disclaimer, the term of this patent is extended or adjusted under 35 U.S.C. 154(b) by 266 days.

(21) Appl. No.: 15/298,724

(22) Filed: Oct. 20, 2016

(65) Prior Publication Data
US 2018/0114027 A1 Apr. 26, 2018

(51) Int. Cl.
*G06F 21/00* (2013.01)
*G06F 21/60* (2013.01)
*G06F 16/27* (2019.01)
*G06F 21/62* (2013.01)
*H04L 9/32* (2006.01)

(52) U.S. Cl.
CPC ............ *G06F 21/602* (2013.01); *G06F 16/27* (2019.01); *G06F 21/6218* (2013.01); *H04L 9/3218* (2013.01); *H04L 2209/046* (2013.01); *H04L 2209/34* (2013.01); *H04L 2209/88* (2013.01)

(58) Field of Classification Search
CPC .............. G06F 21/602; G06F 21/6218; H04L 2209/34; H04L 9/3218
See application file for complete search history.

(56) References Cited

U.S. PATENT DOCUMENTS

| | | | |
|---|---|---|---|
| 8,316,234 B2 | 11/2012 | Huberman et al. | |
| 8,868,654 B2 | 10/2014 | Guha et al. | |
| 9,275,237 B2 | 3/2016 | De Cristofaro et al. | |
| 2006/0179143 A1* | 8/2006 | Walker | G06F 9/5072 709/226 |
| 2010/0017870 A1 | 1/2010 | Kargupta | |
| 2015/0128285 A1* | 5/2015 | LaFever | H04L 67/02 726/26 |
| 2015/0286824 A1 | 10/2015 | Freudiger et al. | |

OTHER PUBLICATIONS

Almishari, M. et al., Privacy-Preserving Matching of Community-Contributed Content, (Research Paper), 2013, 18 Pgs.
Fienberg, S.E., Privacy and Confidentiality in an E-commerce World: Data Mining, Data Warehousing, Matching arid Disclosure Limitation, (Research Paper), Sep. 11, 2006, 15 Pgs.
(Continued)

*Primary Examiner* — Brandon S Hoffman
*Assistant Examiner* — Thong P Truong
(74) *Attorney, Agent, or Firm* — Hewlett Packard Enterprise Patent Department

(57) ABSTRACT

Techniques for secure linking of attributes between a first node and a plurality of nodes are provided. In one aspect, the first node and the plurality of nodes maintain a distributed data set. The techniques may include encoding the attributes as integer values at the first node. The nodes of the plurality of nodes that include matching attributes may be determined using a secure list matching protocol.

10 Claims, 6 Drawing Sheets

(56) References Cited

OTHER PUBLICATIONS

Ranbaduge, T. et al., Tree Based Scalable Indexing for Multi-party Privacy-preserving Record Linkage, (Research Paper), Nov. 27-28, 2014, 12 Pgs.

Schnell et al., "Privacy-Preserving Record Linkage Using Bloom Filters", In BMC Medical Informatics and Decision Making, Aug. 25, 2009, pp. 1-11.

Rane et al., "Privacy-Preserving Nearest Neighbor Methods:Comparing Signals without Revealing Them", Feb. 2013, 26 pages.

Lindell et al., "Secure Multiparty Computation for Privacy-Preserving Data Mining", In Journal of Privacy and Confidentiality, vol. 1, No. 1, 2009, pp. 59-98.

Karr et al., "Secure Regression on Distributed Databases", In Journal of Computational and Graphical Statistics, vol. 14, No. 2, 2005, pp. 1-18.

Jones et al., "A case study of the Secure Anonymous Information Linkage (SAIL) Gateway: A privacy-protecting remote access system for health-related research and evaluation", in Journal of Biomedical Informatics, vol. 50, 2014, pp. 196-204.

Jagannathan et al., "Privacy-Preserving Distributed k-Means Clustering Over Arbitrarily Partitioned Data", Research Track Poster, Aug. 21-24, 2005, pp. 593-599.

Huberman, "The Internet of Things: Ensuring Trust and Security in the Industrial IoT", Ubiquity Symposium ACM Publication, Jan. 2016, pp. 1-7.

Churches et al., "Some Methods for Blindfolded Record Linkage", in BMC Medical Informatics and Decision Making, 2004, pp. 1-17.

Aggarwal et al., "Privacy-Preserving Data Mining: Models and Algorithms", Jun. 2008, 11 pages.

\* cited by examiner

ATTRIBUTE DETERMINATION USING SECURE LIST MATCHING PROTOCOL

BACKGROUND

Advances in technologies such as the Internet of Things (IoT) and other data generating technologies have made it possible to collect and analyze vast quantities of data. Advances in "Big Data" analytics have enabled improved decision making by allowing analysis of the ever increasing amounts of data. There is no indication that this trend of ever increasing data generation and storage shows any signs of slowing down. It can be expected that in the future, the amount of data generated and stored will only increase.

DETAILED DESCRIPTION

Figure 1:
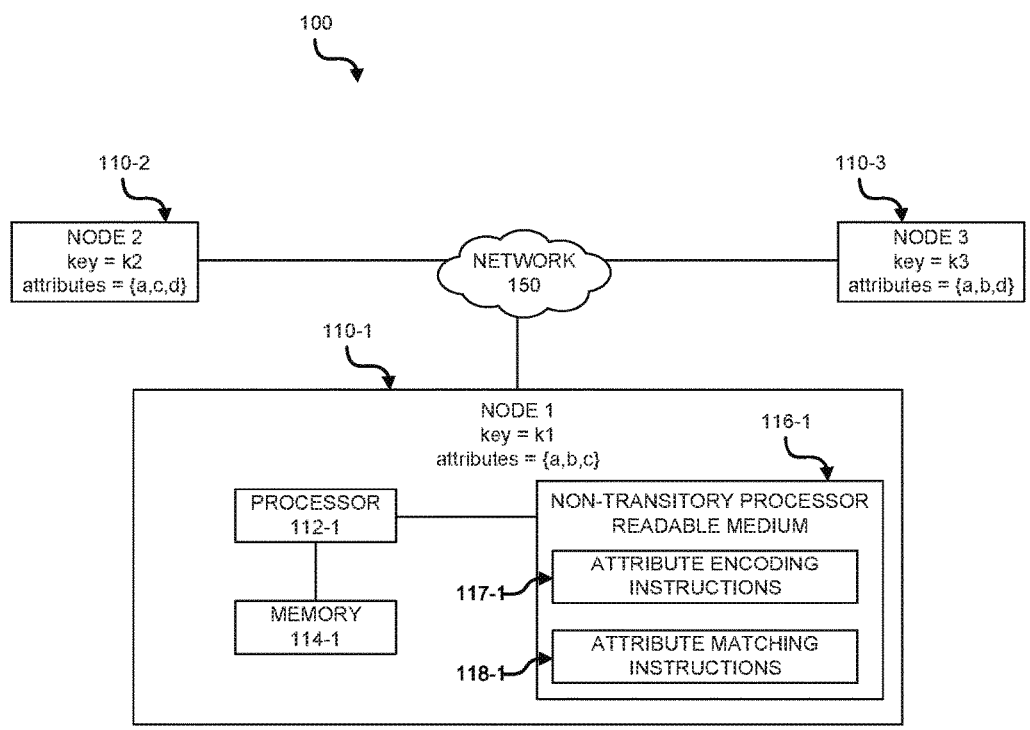
FIG. 1 is an example of a system utilizing the attribute determination using secure list matching protocol techniques described herein.

As mentioned above, it is well understood that the amount of data being generated and stored is on an upward trajectory. Another dynamic that is in play is that multiple parties may be generating similar data and independently storing that data. In many cases, it would be beneficial for the data analytics to be performed across all data, regardless of the party that generated the data. However, each of the parties that generates and stores the data (e.g. owns the data) may not be willing to freely share the data in an uncontrolled manner.

Consider as an example a scenario where a group of hospitals wish to work together to improve the quality of healthcare. Each hospital may have large amounts of data about its own patients. For example, such information may include demographics, past medical history, lab results, current diagnosis, and any number of other pieces of information related to the patient's health. This data may contain a wealth of information that if shared across the group of all hospitals could mutually benefit all parties by enabling faster diagnosis and effective treatment for similar cases.

However, this information also contains extremely sensitive and private information about the patients and the hospitals. For a variety of reasons, including both regulatory and economic reasons, sharing the data without any type of controls may be problematic.

An initial problem that may occur with analysis of such distributed data sets is the ability to securely map and link data from the different data repositories. This problem arises as a pre-processing step in a multi-party distributed data analytics task. The goal is to identify the correspondence between attributes in a distributed data set while at the same time respecting the privacy of the data. As will be explained by example below, the attributes may be record identifiers or may be a particular data element identifier.

In a multi-party distributed analytics problem, the data may be partitioned horizontally, vertically, or in an arbitrary manner. In a horizontal partition, rows representing samples of the database may be owned by different parties. For example, Table 1 shows patient data stored by party A, where each row is indexed by a patient identifier, such as a social security number. For purposes of this description, the row identifiers may be referred to as attributes. In this case, a row attribute identifies a specific patient. Each row may include certain patient information as shown in the columns of Table 1. Each column may have a heading (e.g. age, weight, blood pressure) that can also be referred to as an attribute. However, in this context, attributes identify a particular column, as opposed to identifying a particular patient. Table 2 shows patient data stored by Party B. Again, patient ID may be an identifier such as a social security number. As shown, both parties store some data that is the same about each patient. However, it is also possible that each party, stores additional information. As shown in Table 1, Party A may also store Cholesterol information, while, as shown in Table 2, party B may store Glucose level. Also, there is no guarantee that each party stores data in the same order. As shown, party A stores age in the second column while storing weight in the third column. Party B stores weight in the second column while storing age in the third column. Knowledge of these differences is needed when performing analytics on distributed data sets.

TABLE 1

(Party A)

| Patient SS # | Age | Weight | Blood Pressure | Cholesterol |
| --- | --- | --- | --- | --- |
| 0001 | 5 | 50 | 80 | 112 |
| 0005 | 29 | 125 | 90 | 150 |
| 0100 | 72 | 150 | 100 | 200 |
| ... | ... | ... | ... | ... |
| 0420 | 40 | 200 | 90 | 75 |
| 0710 | 52 | 110 | 80 | 800 |

TABLE 2

(Party B)

| Patient SS # | Weight | Age | Blood Pressure | Glucose |
| --- | --- | --- | --- | --- |
| 0001 | 50 | 5 | 80 | 112 |
| 0003 | 140 | 60 | 70 | 125 |
| 0100 | 150 | 72 | 100 | 200 |
| ... | ... | ... | ... | ... |
| 0420 | 200 | 40 | 90 | 75 |
| 8000 | 250 | 70 | 60 | 40 |

Data may also be partitioned vertically. In vertically partitioned data, columns representing attributes, which may also be referred to as features, of the database are owned by different parties. Continuing with the medical example, we see that party A stores the cholesterol data, and as such is the owner of that data. Party B stores the Glucose data and is the owner of that data. In an arbitrary partition, each party has data belonging to a subset of rows and a subset of columns.

In the above health care example, each party may hold all of the attributes (e.g. weight, age, blood pressure) for a subset of patients as a horizontal partitions, or each party may hold different attributes for the same patient (e.g. cholesterol vs glucose) as vertical partitions. More generally, each party may have data belonging to a subset of patients for a subset of attributes.

When performing multi-party distributed analytics, one of the first steps is to ensure that the datasets and the corresponding attributes are aligned to facilitate subsequent analytics tasks. For example, party A may wish to request from party B rows for all patients that are included in both party A and party B's data sets. A naïve solution to this problem would be for Party A to send a list of all its patient identifiers (e.g. social security numbers) to Party B. Party B could then check its dataset for matches, and return those matches. However, it should be clear that this naïve approach suffers from the fact that party A is forced to disclose identifiers (e.g. attributes such as social security numbers) that party B has no record of when the goal is simply to identify patients that both party A and B have in common.

Likewise, when trying to match attributes such as the column identifiers, Party A could simply send, in plain text, a list of column attributes and their order (e.g. Age, Weight, Blood Pressure, Cholesterol) to party B. However, this would involve exposing potentially proprietary data that Party A does not wish to expose. For example, perhaps party A does not wish to disclose that it stores cholesterol information. The naïve approach described would expose information that the parties may not wish to have exposed.

What is desired would be a way for Party A to request matching attributes from party B without having to actually disclose the attributes that are to be matched. Likewise, Party B would be able to confirm which attributes it is in possession of without having to actually disclose those attributes to party A. The techniques described herein solve this problem through the use of a secure list matching protocol.

The attribute value may first be encoded as an integer value. In some case, this operation may be simple. For example, conversion of a social security number to an integer value would be a straightforward process. In other cases, the process may be a little more complicated. For example, in the case of attributes that are represented by strings (e.g., "age", "weight" "blood pressure") the string could be converted to an integer through several standardized encodings that convert strings to integers, such as ASCII encoding or by a hash function. In some cases, case insensitive string encodings may be used, such that "age" would encode to the same integer value as "AGE" or "Age." The encoding could also take into account special characters and may also eliminate unnecessary whitespace in the string.

The encoding could also be more sophisticated, for example using rule based encoding, such that a set of rules are used to determine the encoding. The rules may take into account things such as common misspellings (e.g., "Katherine Doe" and "Katharine Doe" may both encode as the same integer value). The particular form of encoding is not important. What should be understood is that the attribute, be it a value, such as a social security number, or a column identification attribute, such as "age" or "weight" is encoded as an integer value.

Each party, which can also be referred to as a node or a host that participates in the distributed data set may select a private key. The private key may also be an integer value. The private keys are not shared between hosts. Finally, all of the nodes may agree on a common prime number integer. Because the common prime number is shared between all nodes, any suitable mechanism for its selection may be used. There is no need to keep the prime number a secret. The techniques described herein are not limited to any particular selection mechanism for the private keys or common prime number. Any mechanism that allows each node to have a private key along with a shared prime number between all nodes would be suitable.

In a simple two party, single attribute example, party A may wish to find out if party B includes a particular attribute (e.g. a particular social security number or a particular column identifier, such as "age"). Party A may encode the attribute as an integer value, as discussed above. For purposes of this simple example, assume the integer value is x. Party A may also have a private key, referred to as k1. Party A may then perform the computation $x^{k1}$, which may be referred to as masking the value with a private key. A modulo p operation, where p is the common prime number, may then be performed, to result in $x^{k1}(\text{mod } p)$. This value may then be sent to party B. It should be noted that party B cannot recover either party A's private key or the actual integer x due to the intractability of the discrete logarithm problem. In other words, the modulo operation makes it extremely difficult to solve for k1, even if the value of x is known.

Party B may then receive the value from party A. Party B may then mask the value with its own private key. For example, party B may receive $x^{k1}$ and mask the value with its own private key, k2, resulting in $x^{k1*k2}$, For ease of description, the modulo operation is not described again. However it should be understood that the modulo operation is included in all computations to prevent recovery of private keys by any party. The omission of the modulo operation in the description applies throughout the remainder of the disclosure. However, it should be understood that in actual implementation, each masking operation includes a modulo operation with the shared prime number p.

Party B may then send the masked value $x^{k1*k2}$ back to party A. In addition, Party B may mask its own encoded attribute, referred to as y with its own private key, resulting in masked attribute $y^{k2}$. Party B may send this value to party A.

Upon receipt, party A may store the received value $x^{k1*k2}$ for use in attribute matching. Party A may also mask the received value $y^{k2}$ with its own private key, resulting in $y^{k2*k1}$. Party A may then compare $x^{k1*k2}$ with $y^{k2*k1}$. Because of the property that $a^{b*c}=a^{c*b}$, if $x^{k1*k2}$ equals $y^{k2*k1}$ then x=y, and both party A and B include the same attribute. If the comparison is not equal, then party A can determine that party B does not include the attribute that encodes to the integer value x. What should be understood here is that at no point was the actual attribute information shared. So, for example in the case where a social security number was the attribute, Party B is not able to determine the actual social security number that was being matched.

The techniques described above are not limited to data sets distributed between two parties, and may be extended to data sets distributed amongst an arbitrary number of parties. It should also be noted that the techniques described herein are not dependent on having a trusted third party that acts as a clearing house for matching attributes. These techniques are described in further detail below and in conjunction with the appended figures.

FIG. 1 is an example of a system utilizing the attribute determination using secure list matching protocol techniques described herein. System 100 may include a plurality of nodes, such as nodes 1-3, 110-1 . . . 3. Although only three nodes are shown, this is for purposes of ease of description. The techniques described herein are extensible to any number of nodes. Nodes may also be referred to as hosts, servers, database servers, or any number of other terms. What should be understood is that a node includes a portion of a distributed data set. In particular, a node includes what will be called attributes. An attribute may be an actual identifier for a particular entity, for example, a specific identifier such as a social security number. An attribute may also be an identifier of a type of data, such as a column identifier described above.

Each node 110 may be connected to the other nodes via network 150. The techniques described herein are not dependent on the type of network. For example, the network may be a local or wide area network, an intranet, the internet, a wireless network, public networks, private networks, or any other type of network. What should be understood is that the network 150 allows the nodes 110 to communicate with each other. Any network that is capable of this functionality is suitable for use with the techniques described herein.

The nodes 110-1 . . . 3 may have a structure similar to node 110-1, which is described in further detail. However, it should be understood that the description of node 110-1 is merely an example. All nodes need not have the exact same structure or be implemented in the same way. For example, nodes may be real machines, such as personal computers or servers. Nodes may also be virtual machines running in cloud environments. Nodes may provide distributed dataset functionality as part of the functionality of a larger system that provides other functionality as well.

Node 110-1 may include a processor 112-1, a memory 114-1 and a non-transitory processor readable medium 116-1. The processor may be any type of device that is capable of executing instructions in order to implement the techniques described herein. The processor may be a central processing unit (CPU), a graphics processing unit (GPU), a application specific integrated circuit (ASIC), a field programmable gate array (FPGA), or any other type of device capable of executing machine readable instructions.

The processor may be coupled to a non-transitory processor readable medium 116-1 containing instructions thereon. For example, the medium may be a disk drive (magnetic as well as solid state), a flash drive, a Compact Disc Drive (CD), or any other type of non-transitory medium capable of storing instructions executable by the processor 112-1 for implementing the techniques described herein. For example, the medium 116-1 may include attribute encoding instructions 117-1 and attribute matching instructions 118-1. The operation of these instructions is describe in further detail below and in the flow diagrams depicted in FIGS. 4-6. What should be understood is that the instructions 117-1, 118-1 allow the node to implement the techniques described herein.

The node processor 112-1 may also be coupled to a memory 114-1. In some implementations, the memory may contain the instructions executed by the processor 112-1 to implement the techniques described herein. For example, the instructions 117-1, 118-1 may be loaded from the medium 116-1 into the memory, and the processor may execute the instructions stored in the memory.

The memory 114-1 may also contain data specific to the node. As explained above, the techniques described herein utilize a private key associated with each node. As shown, node 1 may have a private key depicted as key k1. This private key may be stored on the node, for example, in the memory. The node may also contain portions of data sets as described above. These data sets may be horizontally partitioned, vertically partitioned, or partitioned in a combination of horizontal and vertical.

As explained above, the techniques of described herein allow for attributes to be encoded as integers. The attributes may be individual data element identifiers, such as social security numbers described above. Or, the attributes may be identifiers of specific date fields, such as the column identifiers like age and weight described above. These attributes may be encoded as integer values. Node 1 is shown as containing the attribute values a, b, and c, which represent some attributes stored on the node encoded as integer values. It should be understood that this limited set of attributes depicted is for ease of description. The techniques described herein are not limited to any particular number of attributes.

As mentioned above the other nodes may have similar structure to node 1, but the techniques described herein are not so limited. Any node structure capable of executing the functionality described herein would be suitable for use with the techniques described herein. For purposes of further description, Node 2 110-2 is shown as containing private key k2 and attributes a, c, and d. Likewise, Node 3 110-3 is shown as containing private key k3 and attributes a, b, and d. As should be clear, the letter designations represent the integer encodings of the actual attribute values. The system in operation is described in further detail below. It should also be understood that all the nodes share a prime integer (not shown) to be used in the modulo operation.

Figure 2:
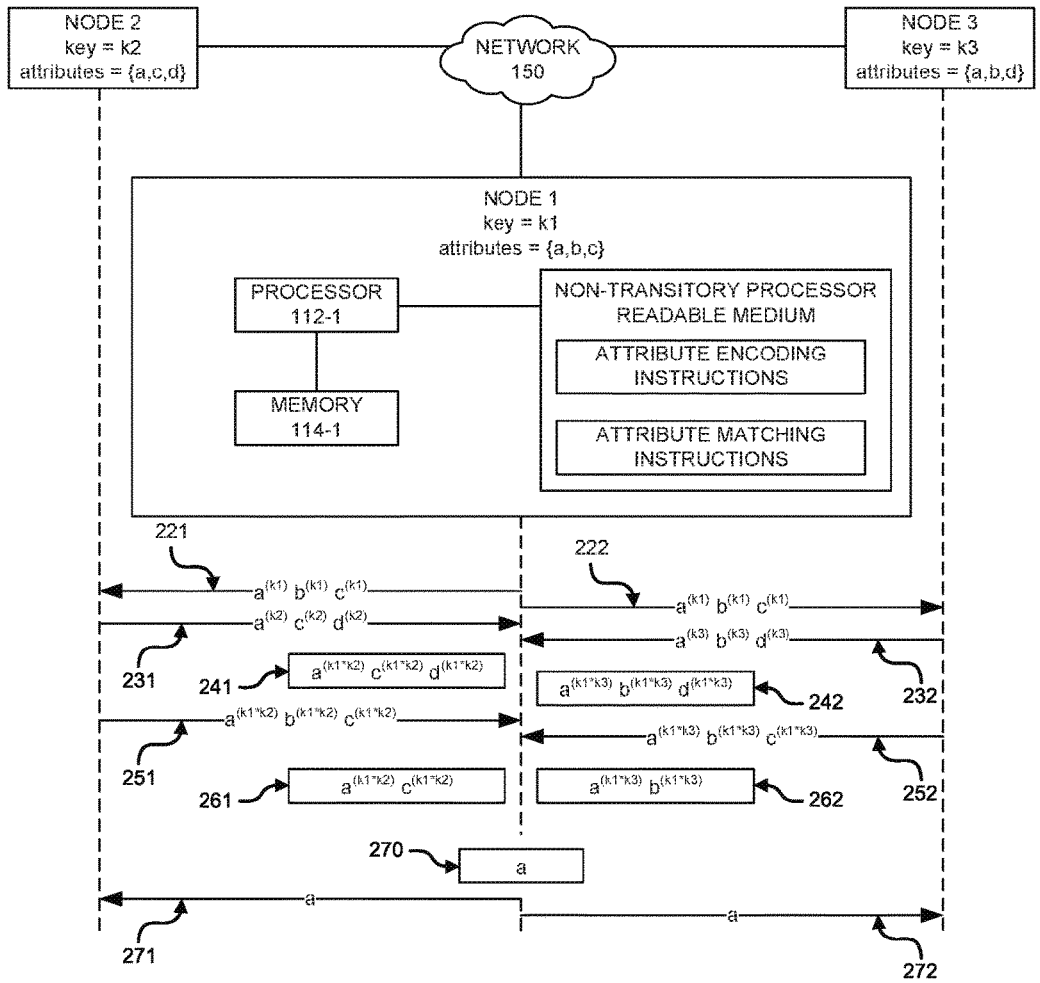
FIG. 2 is an example of a system utilizing the techniques described herein in a pairwise manner.

FIG. 2 is an example of a system utilizing the techniques described herein in a pairwise manner. FIG. 2 describes an implementation of the techniques described herein using a secure list matching protocol in a pairwise manner. An implementation of using a secure list matching protocol in a ring topology is described in further detail with respect to FIG. 3.

As shown, node 1 may first encode each attribute on the node as an integer values. In this example, the encoded attributes may be represented as the integers a, b, and c. Node 1 may then mask these integer values using the private key associated with node 1. Although not shown, the masked, encoded values also have a modulo operation based on a shared prime number performed, in order to make it extremely difficult for other nodes to recover the private key. Node 1 may then send the encoded masked values to nodes 2 and 3, as is depicted by messages 221 and 222, wherein the masked encoded attribute $a^{(k1)}$, $b^{(k1)}$ and $c^{(k1)}$ are sent to nodes 2 and 3.

Upon receipt of the messages 221 and 222 by nodes 2 and 3 respectively, those nodes may then mask their own encoded attributes with their own private keys, and send the results back to node 1. As shown, node 2 includes encoded attributes a, c, and d, which after masking with the private key k2 of node 2 (and the not shown modulo operation) results in masked encoded values $a^{(k2)}$, $c^{(k2)}$, and $d^{(k2)}$, which are returned to node 1 in message 231. Likewise, node 3 includes encoded attributes a, b, and d, which after masking, results in with the private key k3 of node 3 (and the not shown modulo operation) results in masked encoded values $a^{(k3)}$, $b^{(k3)}$, and $d^{(k3)}$, which are returned to node 1 in message 232.

Upon receipt of the messages 231 and 232, node 1 masks the values received form nodes 2 and 3 with its own private key k1 As shown, the resulting values are $a^{(k1*k2)}$, $b^{(k1*k2)}$, and $c^{(k1*k2)}$ shown in box 241, and $a^{(k1*k3)}$, $b^{(k1*k3)}$, and $d^{(k1*k3)}$ shown in box 242.

In addition to sending back its own masked, encoded attributes, each node also takes the masked, encoded attributes received from node 1, and masks the value with its own private key. As shown, nodes 2 and 3 received the masked encoded values $a^{(k1)}$, $b^{(k1)}$, and $c^{(k1)}$ from node 1 in messages 221 and 222. Node 2 masks each of these values with its own private key k2, and returns the values to node 1. As shown, node 2 returns the masked, encoded values $a^{(k1*k2)}$, $b^{(k1*k2)}$, and $c^{(k1*k2)}$ in message 251. Likewise, node 3 masks each of these values with its own private key k3, and returns the values to node 1. As shown, node 3 returns the masked, encoded values $a^{(k1*k3)}$, $b^{(k1*k3)}$, and $c^{(k1*k3)}$ in message 252.

Node 1 may then determine which attributes it has in common with each of nodes 2 and 3. For example, node 1 may compare the computed values shown in box 241 with the values received from node 2. For this comparison, node 1 may determine the intersection of this set, which includes only attributes $a^{(k1*k2)}$ and $c^{(k1*k2)}$ as shown in box. Node 1 is able to determine that encoded attribute a and c are in common between node 1 and node 2. This is because the order of the items sent in message 221 is the same order in which they are returned in message 251. Thus, node 1 knows that there is a match in the first and third element sent, which correspond to attributes a and c.

Likewise, the same process occurs for node 3. Node 1 may determine the intersection of the attributes shown in box 242 with the attributes received in message 252. As shown, node 1 is able to determine that attributes a and b are common between nodes 1 and 3, as shown in box 262. Node 1 may then determine that the attributes in common between nodes 1, 2 and 3, includes attribute a, because that is the intersection 270 of box 261 and 262. Node 1 may then send this attribute to nodes 2 and 3 in messages 271 and 272 respectively. Thus, all nodes now know which attributes are in common amongst all three nodes, but none of the nodes sent any information to another node that the node did not already have.

Figure 3:
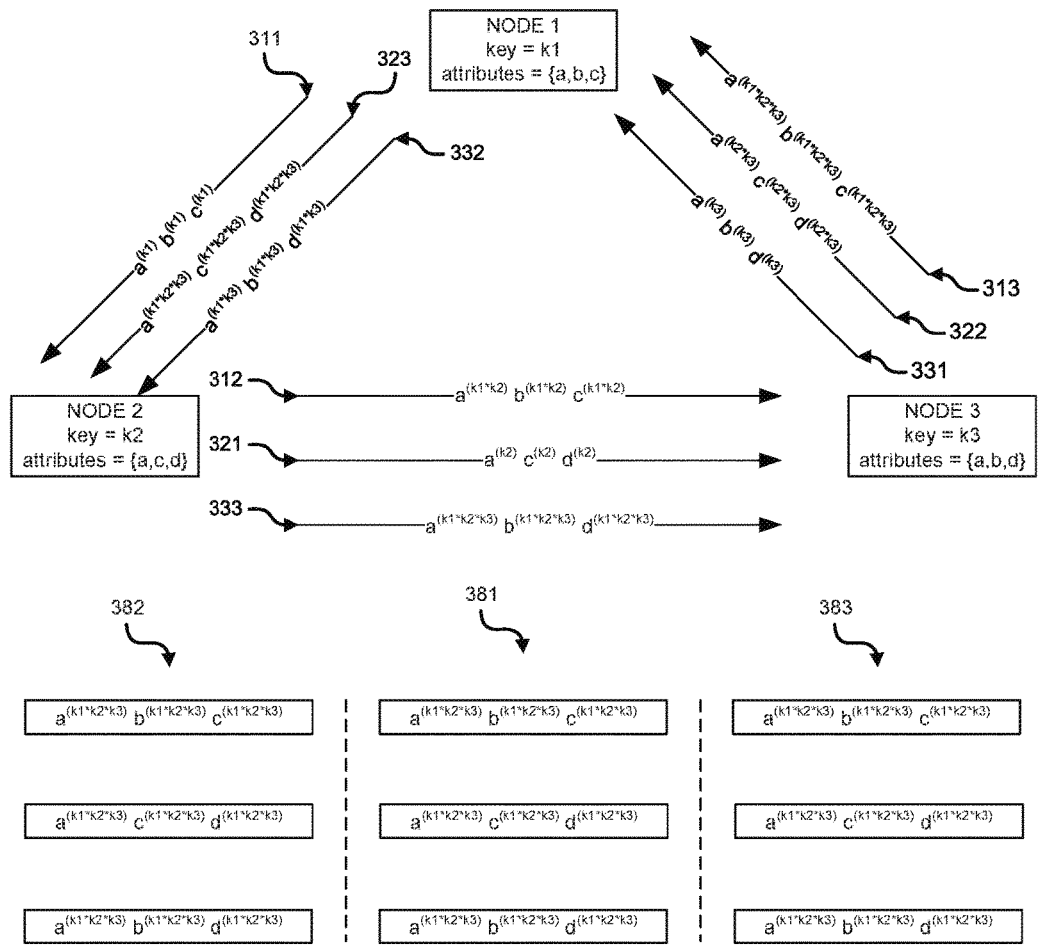
FIG. 3 is an example of a system utilizing the techniques described herein using secure list matching ring protocol.

FIG. 3 is an example of a system utilizing the techniques described herein using secure list matching ring protocol. Although the description of FIG. 3 proceeds sequentially, it should be understood that the process may proceed in parallel, with each node initiating the attribute passing process in parallel. Furthermore, in order to simplify the drawing to better depict the aspects of the secure list matching ring protocol, several details of node 1 have been omitted. However, it should be understood that the node structure depicted in FIG. 3 is the same as that which was depicted in FIGS. 1 and 2.

Node 1 may send message 311 to node 2. As shown, the message may include the encoded attributes (a,b,c) from node one, masked by the private key of node 1. The result being that message 311 included the masked encoded attributes $a^{(k1)}$, $b^{(k1)}$, and $c^{(k1)}$. As above, the modulo operation is omitted. However, it should be understood that the modulo operation is performed to ensure that the private keys may not be easily recovered.

Upon receipt of message 311 by node 2, node 2 may then send message 312 to node 3. Message 312 may be the contents of message 311, masked by the private key of node 2. As such, message 312 may include the encoded masked attributes $a^{(k1*k2)}$, $b^{(k1*k2)}$, and $c^{(k1*k2)}$. Upon receipt of message 312 at node 3, node 3 may then mask the received attribute values with its own private key, k3. Node 3 may then send message 313 back to node 1, with the masked, encoded attribute value $a^{(k1*k2*k3)}$, $b^{(k1*k2*k3)}$, and $c^{(k1*k2*k3)}$.

This same process may occur for each node. For example, node 2 may send message 321, including its own encoded masked attributes, $a^{(k2)}$, $c^{(k2)}$, and $d^{(k2)}$, to node 3. Node 3 may mask the attributes with its own private key and send message 322 to node 1, which includes the encoded masked attributes $a^{(k2*k3)}$, $c^{(k2*k3)}$, and $d^{(k2*k3)}$. Node 1 may encode the received attributes with its own key, resulting in attributes $a^{(k1*k2*k3)}$, $c^{(k1*k2*k3)}$, and $c^{(k1*k2*k3)}$. This result may be returned to node 2 in message 323.

Finally, node 3 may execute the same process. For example, node 3 may send its masked, encoded attributes, $a^{(k3)}$, $b^{(k3)}$, and $d^{(k3)}$ to node 1 in message 331. Node 1 may mask the attributes using key k1, resulting in $a^{(k1*k3)}$, $b^{(k1*k3)}$, and $d^{(k1*k3)}$ and send those attributes to node 2 in message 332. Finally, node 2 may mask the values using its private key k3, and send the values, $a^{(k1*k2*k3)}$, $b^{(k1*k2*k3)}$, and $d^{(k1*k2*k3)}$ back to node 3 in message 333.

At this point, each node has a list of all of its own attributes after having been masked by the private keys of all other nodes. For example, message 313, 323, and 333 contain node 1, node 2, and node 3's attributes after having been encoded and masked by each nodes private keys. These values may then be shared with all other nodes. In one example implementation, each node may send the list of attributes that have been masked with the keys of all other nodes to each other node directly (e.g., each node distributes the list to the other nodes). In another example implementation, a third party may receive the masked, encoded value and distribute to the remaining nodes. It should be noted that the third party need not be trusted, because the third party never receives the attribute values in a form in which the actual values can be recovered.

As shown in FIG. 3, each node now has a complete list of all attribute values 381, 382, 383 as masked and encoded by all other nodes. Each node may then take the intersection of the values to determine which attribute vales it has in common with the other nodes. Each node may then also determine the set of attribute values that are common to all nodes by taking the intersection of all sets.

Figure 4:
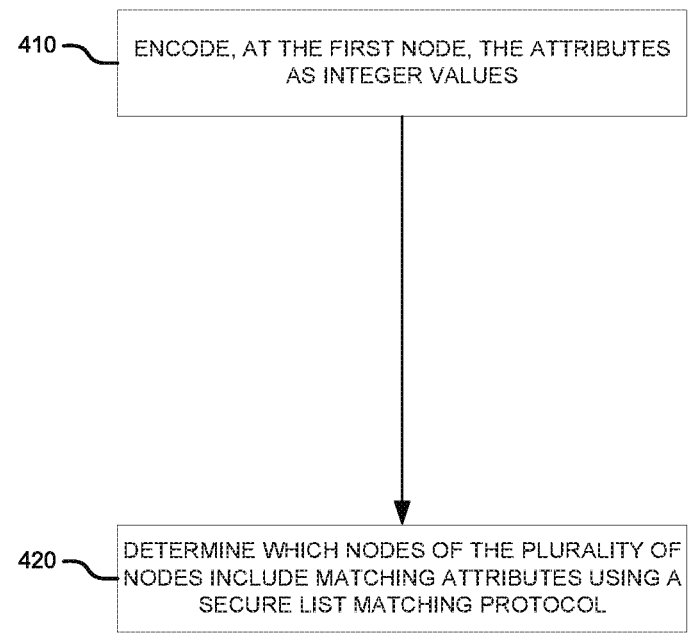
FIG. 4 is an example flow diagram for matching attributes according to techniques described herein.

FIG. 4 is an example flow diagram for matching attributes according to techniques described herein. In block 410, the attributes may be encoded, at the first node, as integer values. As explained above, the attributes, whether they identify specific elements, such as social security numbers, or are descriptors, such as column identifiers, may be encoded as integer values. This encoding may utilize the techniques described above to encode strings, such as rules base encoding, ASCII encoding, or any other type of suitable encoding to encode an attribute as an integer value.

In block 420, it may be determined which nodes of the plurality of nodes include matching attributes by using a secure list matching protocol. A secure list matching protocol may be a protocol as described above with respect to FIGS. 1-3, and as described in further detail below with respect to FIGS. 5 and 6. The secure list matching protocol allows nodes to determine which attributes they all hold in common, without requiring that each node actually disclose the actual attribute value to other nodes.

Figure 5:
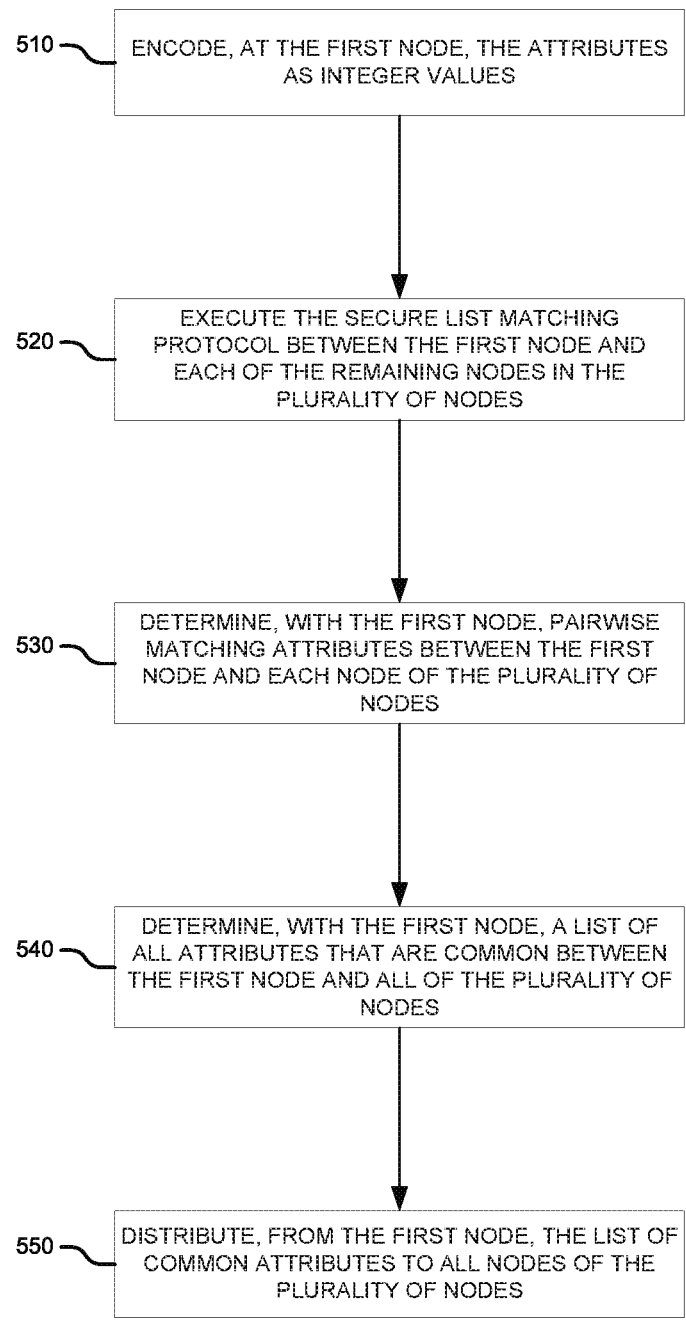
FIG. 5 is an example flow diagram for pairwise attribute matching using techniques described herein.

FIG. 5 is an example flow diagram for pairwise attribute matching using techniques described herein. In block 510, just as above in block 410, The attributes may be encoded, at the first node as integer values.

In block 520, the secure list matching protocol may be executed between the first node and each of the remaining nodes in the plurality of nodes. In other words, each pair of nodes may execute the secure list matching protocol as was described above, and with respect to FIG. 2.

In block 530, it may be determined, with the first node, pairwise matching attributes between the first node and each node of the plurality of nodes. In other words, the first node, using the secure list matching protocol described above, may determine which attributes it has in common with each of the remaining nodes. It should be noted that at this point, the remaining nodes do not have an indication of which nodes are in common amongst all the nodes, because the secure list matching protocol has only been executed between the first node and all of the remaining nodes.

In block 540, it may be determined, with the first node, a list of all attributes that are common between the first node and all of the plurality of nodes. In other words, at this point, the first node knows which attributes it has in common with each of the other nodes. The first node may then perform an intersection of these sets to determine the attributes that are common amongst all of the nodes.

In block 550, the list of common attributes to all of the nodes of the plurality of nodes may be distributed from the first node. This way, all nodes involved in the distributed data sets know which attributes they all have in common. As explained above, those attributes may be specific record identifiers (e.g. social security numbers) or may be column identifiers (e.g. age or weight).

Figure 6:
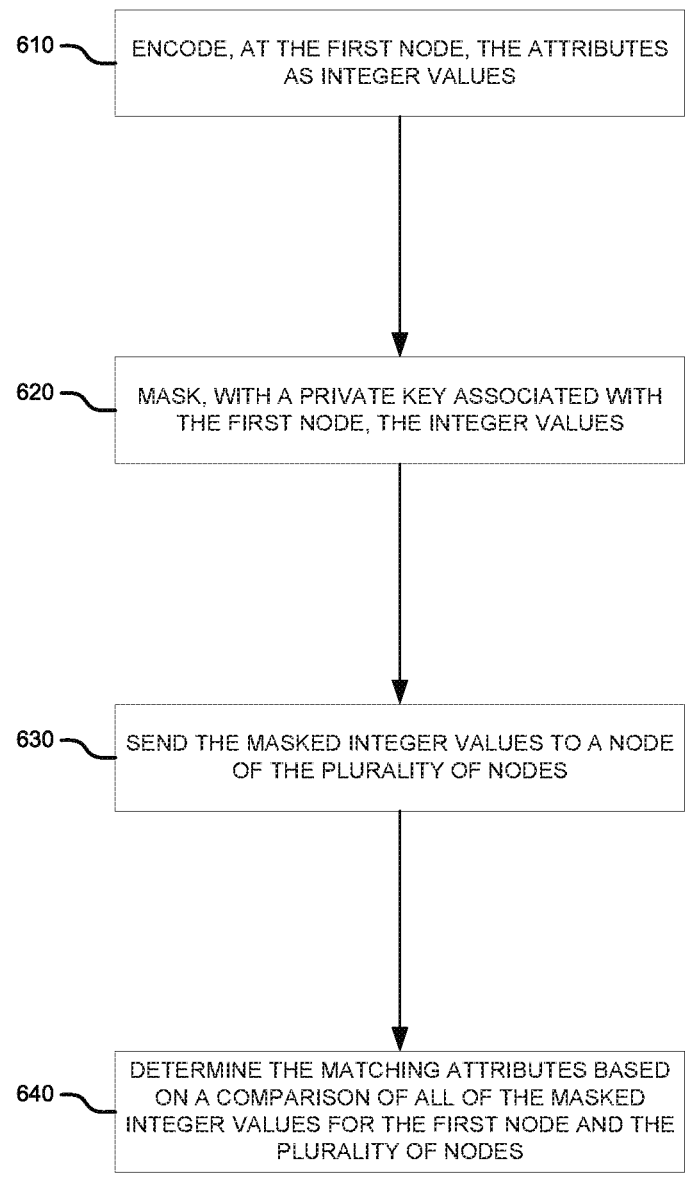
FIG. 6 is an example flow diagram for attribute matching using a ring protocol using techniques described herein.

FIG. 6 is an example flow diagram for attribute matching using a ring protocol using techniques described herein. In block 610, just as above in blocks 410 and 510, the attributes may be encoded as integer values.

In block 620, the integer values may be masked with a private key. As described above, the private key may be associate with the first node and is only known by the first node. As mentioned above, the masking operation also includes a modulo operation, such that the attribute value cannot be easily recovered.

In block 630, the masked integer values may be sent to a node of the plurality of nodes. Although not shown in FIG. 6, but as was described in FIG. 3, the receiving node may receive the values, mask the values with its own private key, and pass the newly masked values on to the next node. This process may be repeated until all nodes have masked the attribute values with their own private key. The masked values are then returned to the originating node. Each node in the plurality of nodes may execute this same process as part of the secure ring matching protocol.

In block 640, the matching attributes may be determined based on a comparison of all of the masked integer values for the first node and the plurality of nodes. In other words, each node have received back its own list of attributes that have been makes with the private keys of all the other nodes, each node then shares this list with all other nodes. As explained above with respect to FIG. 3, each node may then use this information to determine which attributes are common throughout the entire set of nodes as well as which attributes are common between any given pair of nodes. As explained above, this determination does not require the presence of a trusted third party, because only masked encoded integers are passed around between nodes. A third party, if involved, would not be able to recover the original attribute values.

We claim:

1. A method for secure linking of attributes between a first computer-based node and a plurality of computer-based nodes, the first computer-based node and the plurality of computer-based nodes maintaining a distributed data set, comprising:
encoding, by a processor of the first computer-based node, the attributes as integer values; and
determining, by the processor, using a secure list matching ring protocol, which computer-based nodes of the plurality of computer-based nodes include matching attributes using a secure list matching protocol,
wherein the using of the secure list matching ring protocol includes:
masking, with a private key associated with the first computer-based node, the integer values, and
sending the masked integer values to a computer-based node of the plurality of computer-based nodes, wherein the computer-based node of the plurality of computer-based nodes masks the masked integer values with a private key associated with the computer-based node of the plurality of computer-based nodes, and forwards the integer values masked with a private key associated with the computer-based node to a next computer-based node of the plurality of computer-based nodes, wherein the forwarding and private key masking process is repeated until all computer-based nodes of the plurality of computer-based nodes have masked the integer values with private keys associated with each of the computer-based nodes and the result is returned to the first computer-based node.

2. The method of claim 1, wherein determining which computer-based nodes of the plurality of computer-based nodes include matching attributes using the secure list matching protocol further comprises:
executing the secure list matching protocol between the first computer-based node and each of the remaining computer-based nodes in the plurality of computer-based nodes; and
determining, with the first computer-based node, pairwise matching attributes between the first computer-based node and each computer-based node of the plurality of computer-based nodes.

3. The method of claim 2, further comprising:
determining, with the first computer-based node, a list of all attributes that are common between the first computer-based node and all of the plurality of computer-based nodes; and
distributing, from the first computer-based node, the list of common attributes to all computer-based nodes of the plurality of computer-based nodes.

4. The method of claim 1, wherein the process of encoding the attributes as integer values and masking with the private keys of each computer-based node of the plurality of computer-based nodes is repeated for each computer-based node of the plurality of computer-based nodes.

5. The method of claim 4, further comprising:
determining the matching attributes based on a comparison of all of the masked integer values for the first computer-based node and the plurality of computer-based nodes.

6. The method of claim 1, wherein the distributed data set is partitioned vertically.

7. The method of claim 1, wherein the distributed data set is partitioned horizontally.

8. A non-transitory processor readable medium containing a set of instructions thereon that when executed by the processor cause the processor to:
encode an attribute of a distributed data set as an integer value, wherein the distributed data set is distributed over a plurality of hosts;
mask the encoded attribute with a first private key, to form a first value;
send the first value to another host of the plurality of hosts;
receive a second value from the another host of the plurality of hosts, the second value being an encoded attribute of the another host masked with a second private key;
mask the second value with the first private key;

receive a third value form the another host, the third value being the first value masked with the second key; and comparing the second and third value, wherein when the second and third values are equal, the attribute is included on the another host; and determine which hosts of the plurality of hosts include an attribute that matches the encoded attribute using a secure list matching protocol.

9. The medium of claim 8, further comprising instructions to:

mask the encoded attribute with a first private key, to form a first value;

send the first value to another host of the plurality of hosts, wherein each host of the plurality of hosts masks the received value with its own private key; and receive a second value, the second value being the encoded attribute value masked with the private key of each host of the plurality of hosts.

10. The medium of claim 9, further comprising instructions to:

distribute the second value to all hosts of the plurality of hosts;

receive third values from all hosts of the plurality of hosts, the third values being encoded attributes from each host masked with the private key of all hosts of the plurality of hosts; and determine the attributes that match on each host based on a comparison of the second value with each of the third values.

\* \* \* \* \*